H. LUTZ.
TOOL GRINDING MACHINE.
APPLICATION FILED DEC. 17, 1920.
1,434,131.
Patented Oct. 31, 1922.
6 SHEETS—SHEET 3.
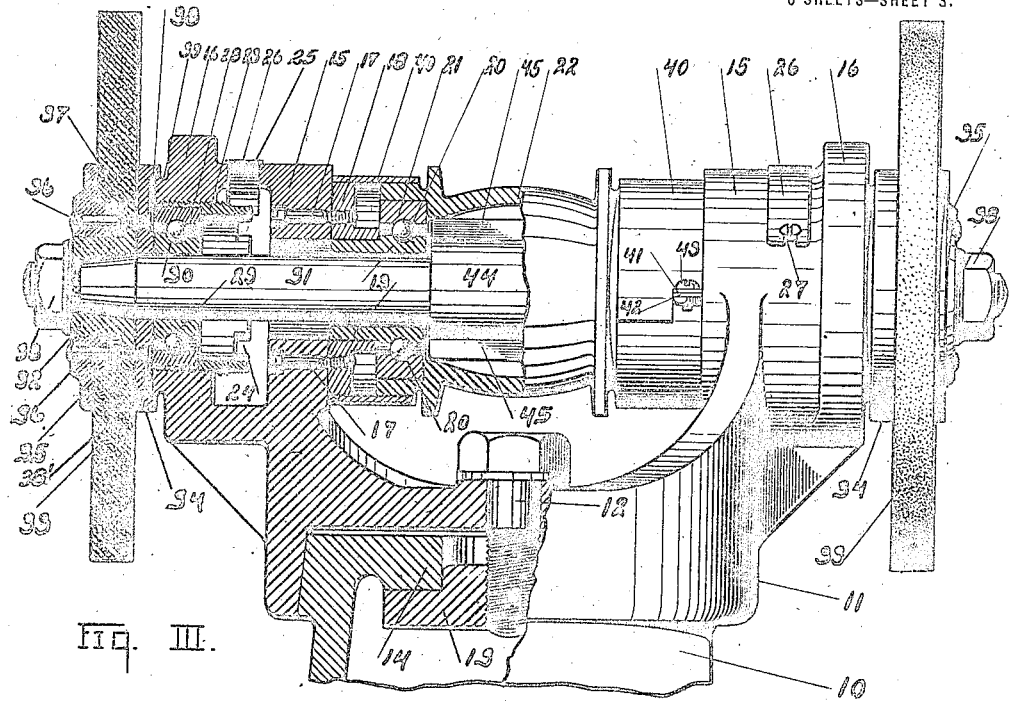
Fig. III.
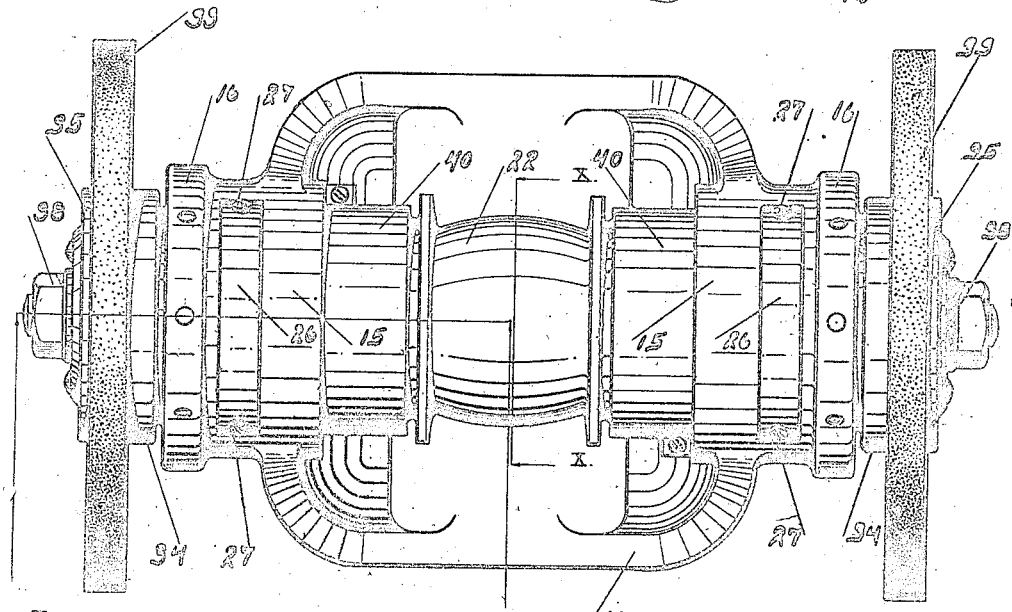
Fig. IV.
INVENTOR.
Hans Lutz
BY
ATTORNEYS.

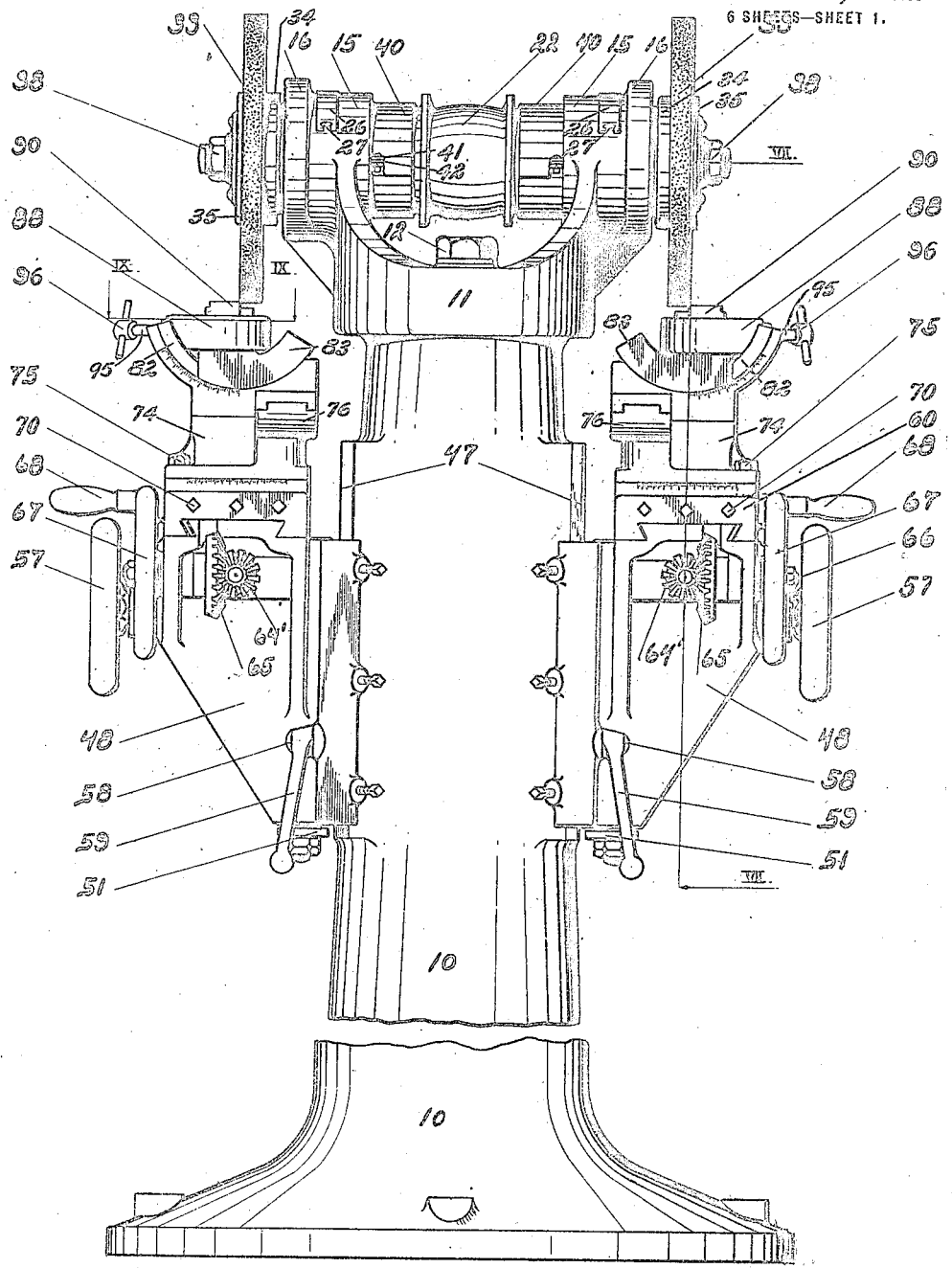
FIG. I.

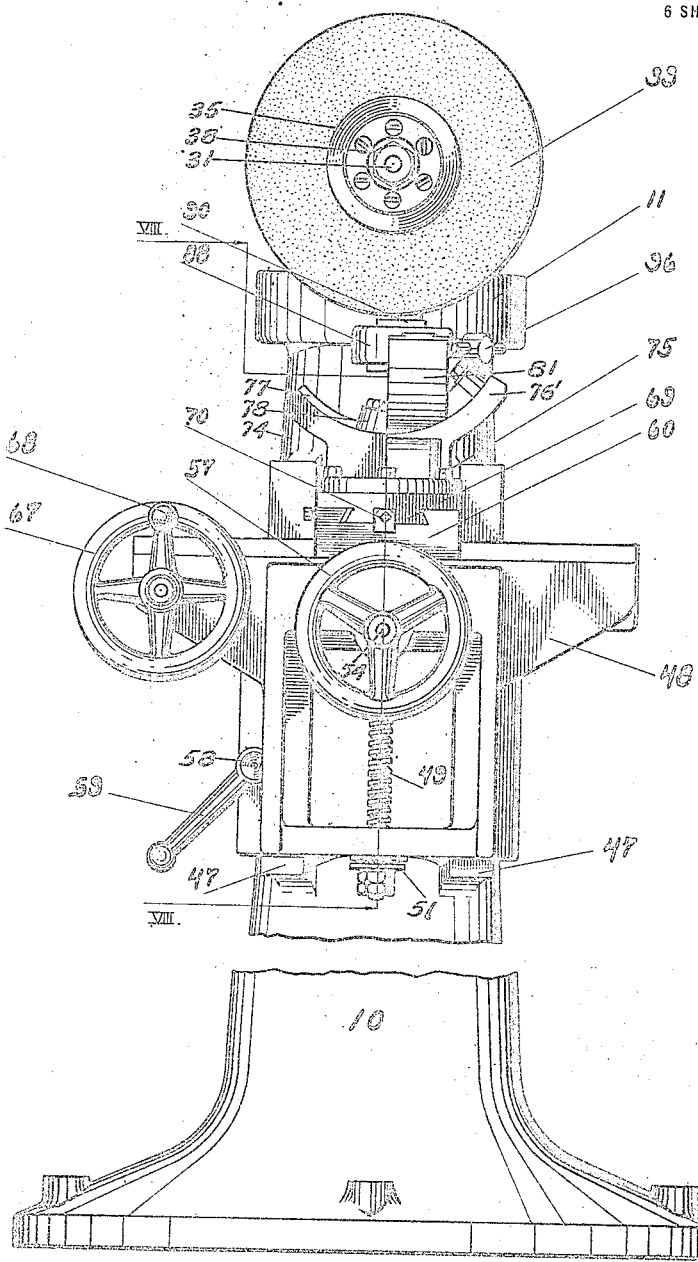

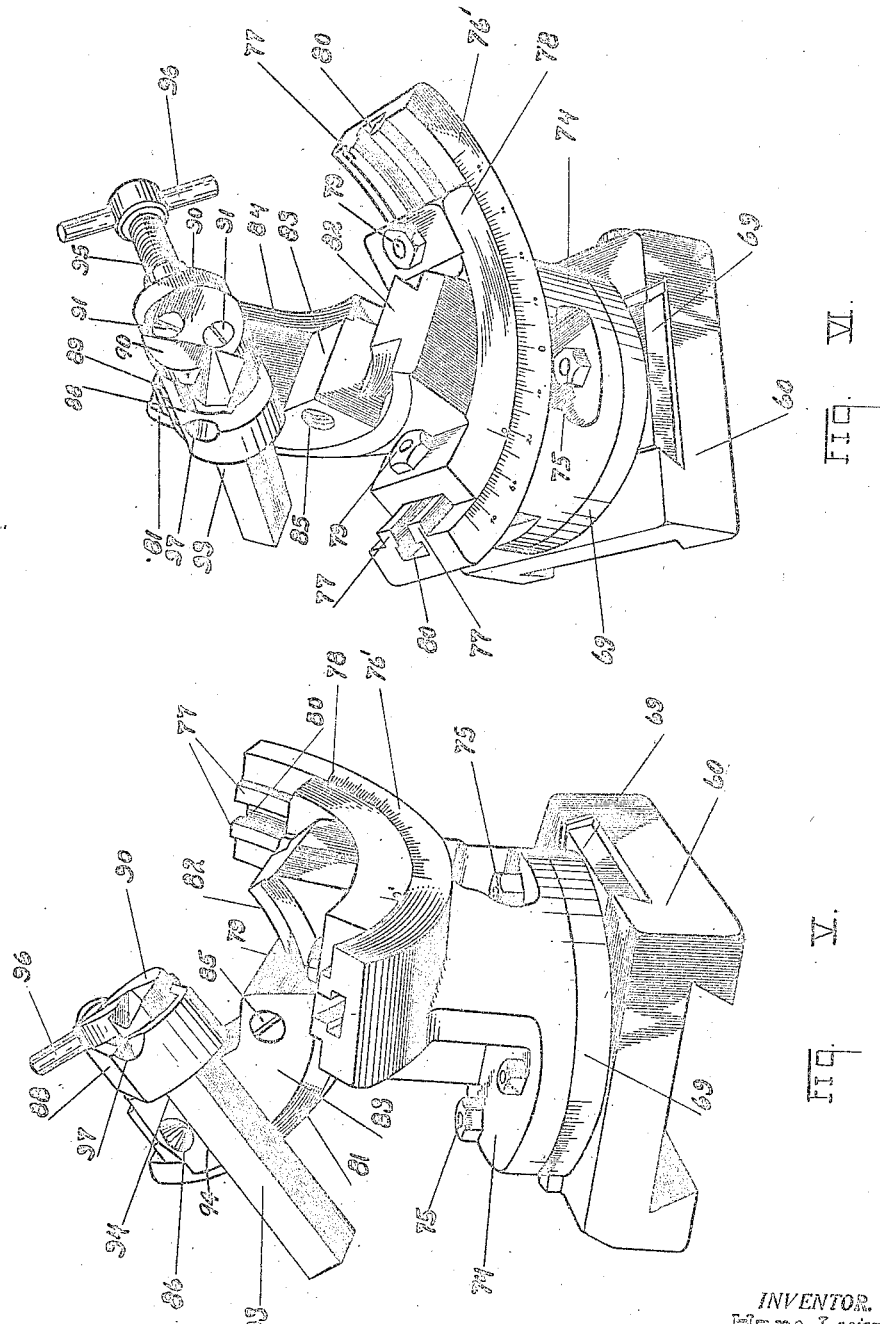

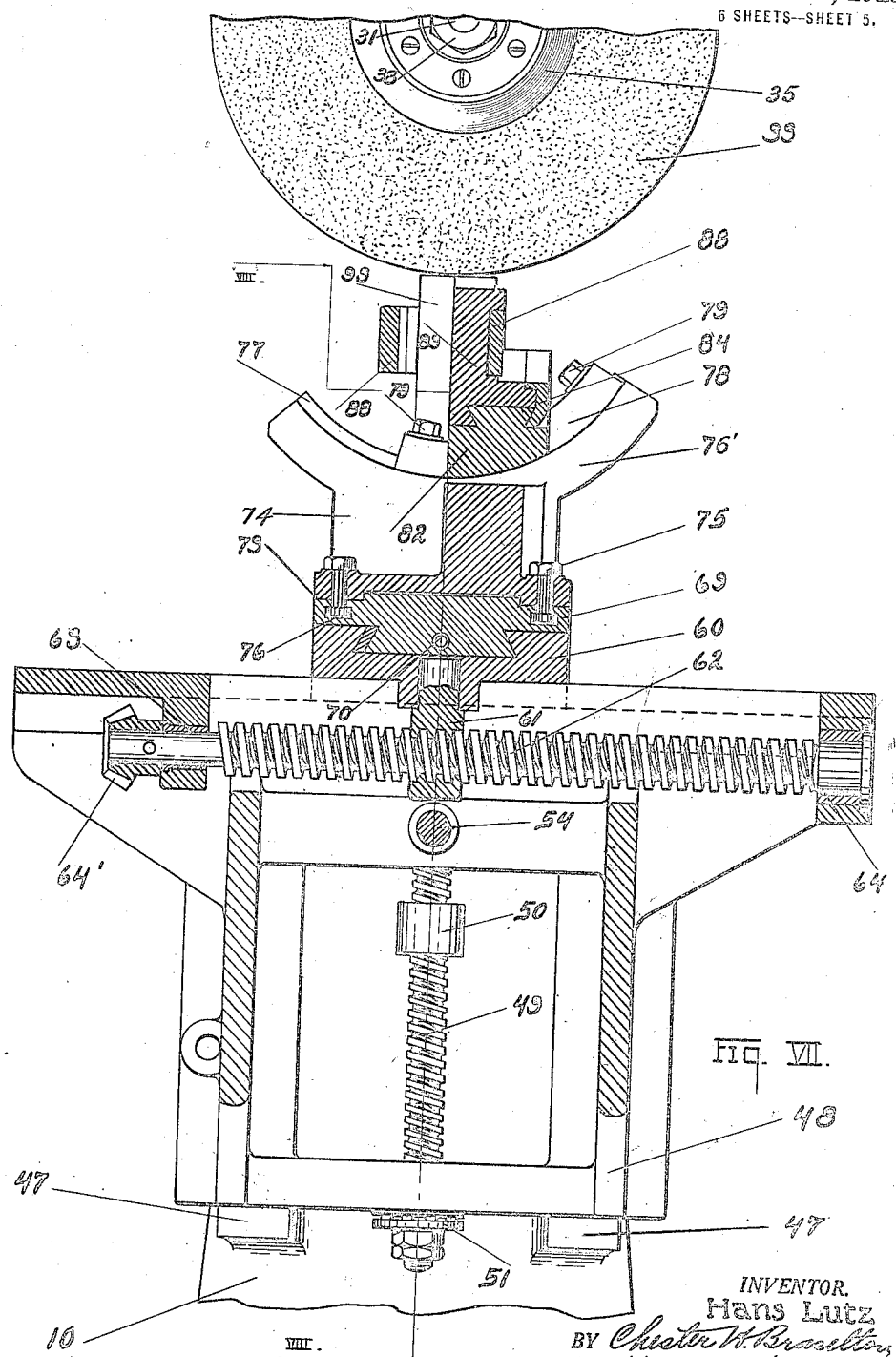

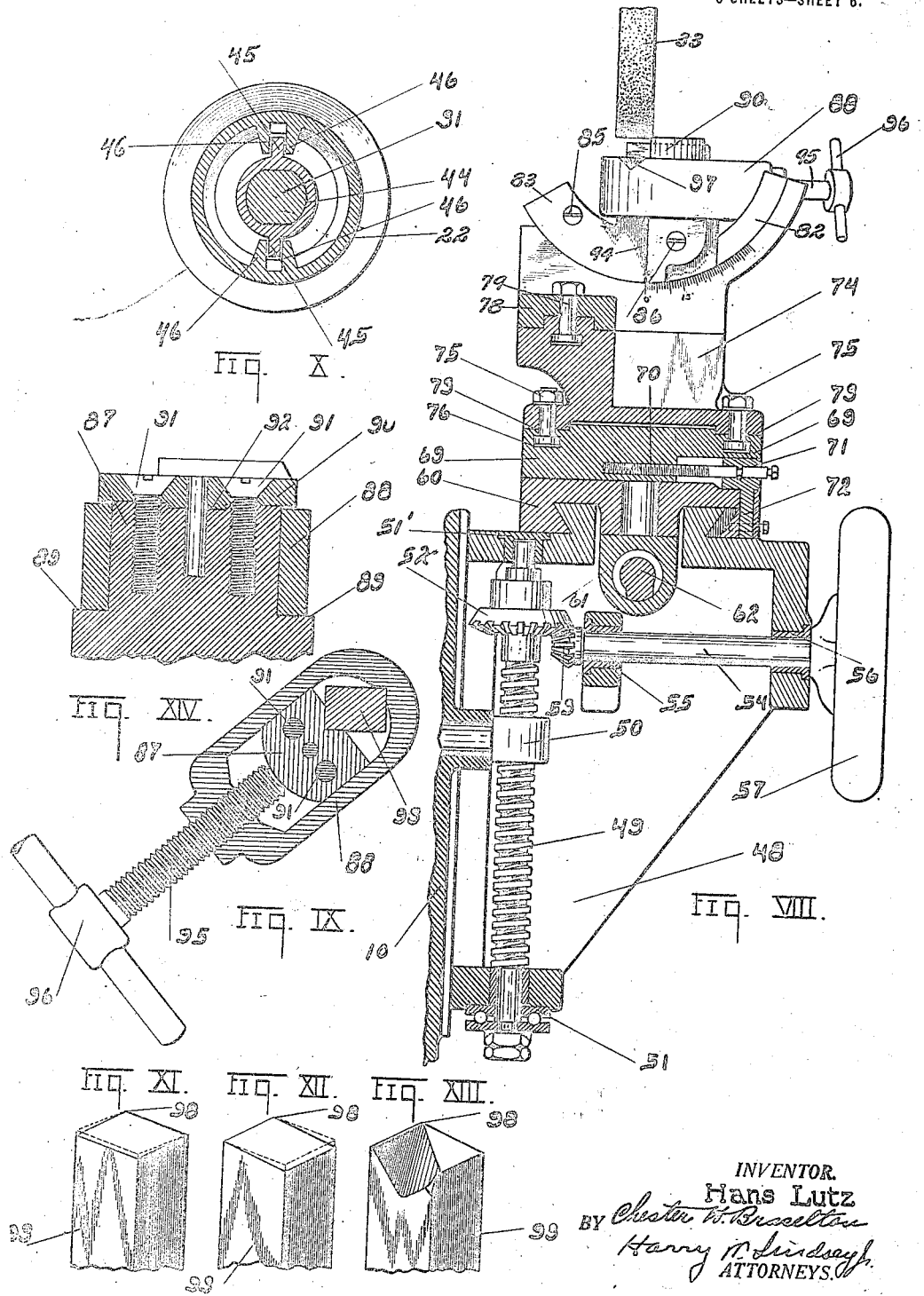

Patented Oct. 31, 1922.

1,434,131

UNITED STATES PATENT OFFICE.

HANS LUTZ, OF ELMIRA, NEW YORK, ASSIGNOR TO THE WILLYS-MORROW COMPANY, OF ELMIRA, NEW YORK, A CORPORATION OF OHIO.

TOOL-GRINDING MACHINE.

Application filed December 17, 1920. Serial No. 431,383.

*To all whom it may concern:*

Be it known that I, HANS LUTZ, residing at Elmira, county of Chemung, State of New York, have invented certain new and useful Improvements in Tool-Grinding Machines, of which I declare the following to be a full, clear, and exact description.

My invention relates to tool grinding machines and has for its object to provide a machine for holding the tools to be ground at predetermined angles with respect to the grinding wheel in order that the tools may be uniformly ground so that the cutting edges of each of the tools, for performing a particular kind of work, will all be ground accurately to the desired angle.

A further object of the invention is to provide a tool grinder in which the holder for the tool is mounted to move in such a manner as to cause the tool to pivot about a fixed or predetermined point with respect to the grinding wheel, the holder being movable in different directions to vary the inclination of the tool which may be set at any desired angle with respect to the grinding wheel.

A further object of the invention is to provide a machine of the class described having a grinding wheel with improved means for supporting the tool in contact with the grinding wheel in such a manner as to cause the latter to produce the clearance angle, lip angle and slope angle in one operation.

A further object of the invention is to provide a grinding machine having an improved arrangement for supporting and rotating a grinding wheel, together with improved means for supporting and moving the tool to be ground in contact with the wheel.

With these and other objects in view the invention comprises certain novel features of construction and arrangement of parts as will be hereinafter more fully described and pointed out in the appended claims, it being understood that the invention shown and described herein is susceptible of various modifications, embodiments and arrangements to suit special or varying conditions and I wish it to be understood that the terms which I have used are merely descriptive and not limiting, and that it is my intention to include any and all modifications which come within the scope of the invention as defined in the claims appended hereunto.

A structure constituting one embodiment of my invention is illustrated in the accompanying drawings, in which:

Figure I is a side elevation of machine embodying the invention.

Figure II is an end elevation of the same.

Figure III is an enlarged side elevation of the upper portion of the machine, one half of which constitutes a section taken on line III—III of Figure IV.

Figure IV is a top plan view of that portion of the machine shown in Figure III.

Figure V is a perspective view of the tool holder.

Figure VI is a perspective view of the holder shown in Figure V, looking at the same from a different direction.

Figure VII is a sectional elevation taken on line VII—VII of Figure I.

Figure VIII is a sectional elevation taken on line VIII—VIII of Figures II and VII.

Figure IX is a sectional view taken on line IX—IX of Figure I.

Figure X is a sectional view taken on line X—X of Figure IV.

Figures XI to XIII inclusive are views showing the different angles at which the tool is ground to complete the same.

Figure XIV is a sectional view of the tool holding post and slide block with which it is connected.

Similar reference numerals refer to similar parts throughout the several figures of the drawings.

The purpose of the present invention is to provide a machine capable of holding and grinding tools of various kinds for performing different classes of work, one of the essential features being the turning out of a large number of tools, the cutting edges of which are accurately ground to a predetermined angle. Heretofore the grinding of tools has been performed by hand and with this method it has been impossible to produce a given set of tools having cutting edges produced with any degree of uniformity, and since it has been determined that metal cutting tools will last longer and perform better work when ground to certain predetermined angles, depending of course upon the class of work to be performed, it is essential that the tools be ground to the angle which has been previously determined as that affording the best results for the particular kind of work to be accomplished.

Referring to the drawings 10 represents a base having a removable head 11 secured thereon by means of a screw 12 threaded into a plate 13 positioned beneath the inturned flange 14 of the base as shown in Figure III. The head 11 is provided at its opposite sides with cylindrical portions having the inner and outer connected end walls 15 and 16 respectively. Secured on the inner face of the wall 15, by means of screws 17, is a ring 18 for supporting the antifriction bearing comprising the inner ring 19 carrying the balls 20, on which is mounted the outer ring 21 positioned within a recess formed in the end of the drive pulley 22 to support the latter as shown in Figure III. Screwed into the end wall 16 is a sleeve like member 23 provided with notches 24 on its inner end to receive a suitable tool for turning said member to adjust it to the desired position, the tool being either insertable through an opening 25 or through the opening in the wall 16 before the antifriction bearing is inserted therein, said opening 25 being covered by means of a removable plate 26 held in position by means of screws 27 as shown in Figures III and IV. The sleeve 23 is recessed at its outer end to receive the bearing ring 28 which together with the inner ring 29 and the balls 30 constitute the antifriction bearing for the shaft 31 which is tapered at its other end to receive the hub 32 upon which the grinding wheel 33 is mounted. The grinding wheel 33 is held upon the hub by means of the inner and outer plate members 34 and 35 respectively, which are connected by means of screws 36 which also pass through the flange 37 on the hub 32 as shown in section in Figure III. A nut 38 is screwed on the end of the shaft 31 to prevent displacement of the hub and the grinding wheel carried thereby. The inner face of the plate 34 is preferably recessed as indicated at 38' to receive the annular projection 39 on the wall 16 for the purpose of affording a dust proof joint between said parts to protect the anti-friction bearing supporting the shaft 31. The anti-friction bearings for supporting the pulley 22 are protected by means of the band 40 having outwardly extending tongues 41 and 42 connected by means of screws 43, said band being adapted to overlie and rest upon the ring 18 and the annular flange on the outer end of the pulley 22 as shown in Figure III. As both sides of the head 11 and the parts mounted thereon are of like construction, a description of the one will suffice for both. The driving pulley 22 is supported entirely independent of the shaft 31 by the antifriction bearings carried by the rings 18, but at the same time the pulley serves to drive the shaft by means of a sleeve 44 secured upon the shaft within the pulley, said sleeve being provided with oppositely arranged projections 45 extending between the inwardly projecting ribs 46 on the pulley, as shown in Figure X. By means of this construction rotation of the pulley will effect rotation of the shaft and consequently the grinding wheels 33 on the opposite ends of the shaft. The base or pedestal 10 on its opposite sides beneath the grinding wheels 33, is provided with guides 47 upon which the slide or carriage 48 is adjustable up and down by means of a feed screw 49 threaded through an eye 50 supported by the pedestal 10, the lower end of said screw being carried by a thrust bearing 51 secured upon the lower end of the carriage 48, the upper end of the screw being journaled in a bearing 51' and provided with a bevel gear 52 meshing with a pinion 53 upon the inner end of a shaft 54 journaled in bearings 55 and 56 suitably supported by the carriage as shown in Figure VIII. The outer end of shaft 54 is provided with a wheel 57 by means of which it is conveniently rotated to effect vertical adjustment of the carriage for the purpose of keeping the work in contact with the grinding wheels. The slide or carriage may be held in any desired position of adjustment by means of a clamp bolt 58 having a beveled head thereon adapted to engage the vertically disposed guide 47 on the pedestal 10, said bolt being reciprocally mounted upon the carriage and adapted to be drawn into clamping engagement with the guide by rotation of a handle 59 threadedly connected with the bolt. Mounted for reciprocal movement upon the carriage 48 is a slide 60 having a downwardly extending eye 61 through which is threaded a feed screw 62 journaled at its opposite ends in bearings 63 and 64 supported by the carriage as shown in Figure VII. On one end of the feed screw 62 is a bevel pinion 64' meshing with a gear 65 on a shaft 66 upon the outer end of which is positioned a wheel 67 provided with a handle 68 by means of which the wheel is rotated. This mechanism serves to move the slide 60 in opposite directions beneath the grinding wheel 33. Movable transversely upon the slide 60 is a carriage 69 adapted to be reciprocated by means of feed screw 70 extending through an eye 71 having a downwardly extending portion 72 projecting into a recess formed in the slide 60. Rotatably mounted upon the upper face 73 of the carriage 69 is a turn-table 74 adapted to be clamped upon the carriage by means of bolts 75, the heads of which are disposed within an annular recess 76 formed in the carriage as shown in Figure VIII. The turn-table 74 is provided with an arcuate portion 76' having upstanding guides 77 adapted to receive the segmental slide 78 as shown in Figures V and VI, the slide being clamped in any desired position by means of the bolts 79 extending into the groove 80 formed between the guides 77. The segmental slide 78 is provided with a laterally extending arm 81 carrying on its upper face an arcuate undercut projection 82 forming a guide for the tool holding slide block 83 which is reciprocally mounted upon the arm 81 and provided with an undercut groove to receive the indirect projection 82. The portion 84 of the slide block is removable and forms a clamping member which is adapted to be held in clamped position upon the undercut projection 82 by means of the screws 85 and 86 extending through the block into threaded engagement with the clamping member. The slide block 83 is provided with an upstanding post 87 adapted to receive the tool holding yoke 88, which rests upon the shoulder 89 of the post and is held against displacement by means of the removable cap 90 secured upon the post by means of the screws 91, said cap being prevented from turning by means of a projection 92 lying within a recess formed in the outer face of the post as shown in Figure XIV. The cap 90 is notched at one side to receive the upper portion of the tool 93, the yoke being also notched to receive the opposite edge of the tool as shown in Figures VI and IX. A shoulder or abutment 94 is formed upon the block 83 at right angles thereto and together with the block forms a seat for the tool which is clamped thereon by means of the yoke 88 upon the tightening of the screw 95, which is threaded through one end of the yoke into engagement with the tool post as shown in Figure IX, said screw being provided with a handle 96 for turning the same. By supporting the tool at two different points and placing the clamping member between these points the tool is firmly held in the desired position upon the slide and is prevented from rocking or shifting thereon. The yoke is preferably notched at 97 to permit the grinding wheel to engage the tool with the end of the latter projected slightly above the yoke and substantially flush with the cap 90. The arm 81 is graduated in degrees and minutes and the slide 83 is provided with a zero point whereby the operator may set the same to bring the tool to the desired angle with respect to the grinding wheel. The arcuate portion 76 of the turntable 74 is also graduated in degrees and minutes as shown in Figure VI while a zero point is inscribed upon the base of the slide 78 and by loosening the bolts 79 the slide may be moved to the desired position or as many degrees and minutes as may be required to cause the grinding wheel to grind the end of the tool to whatever angle may have been previously determined upon. The circular portion of the carriage 69 is also divided into degrees and minutes as indicated in Figure V while the turn-table 74 thereon is provided with a zero point and by loosening the bolts 75 the turn-table may be rotated to adjust the same the desired amount. By means of the turn-table and the two arcuate slides the tool may be rotated either in a horizontal plane or in vertical planes at right angles to each other. The tool therefore may be moved through all of the angles it would be possible to move it through if it were mounted for universal movement.

Figures XI to XIII inclusive indicate the different cuts required in producing the finished tool, it being understood that all of the surfaces which slope from the corner point 98 are accurately ground to predetermined angles, by reason of the improved mechanism described herein.

While I have illustrated and described one embodiment of my invention it will be understood that I do not wish to be limited to the specific construction and arrangement of parts shown, as it will be apparent that various modifications may be made in the detail construction and manner of assembling the parts without departing from the spirit of the invention as expressed in the claims.

What I claim as new and desire to secure by Letters Patent is:

1. In a tool grinding machine, a grinding wheel, a tool holder adapted to support a tool in contact with the wheel, means adapted to swing said holder in circular paths at right angles to each other and means adapted to rotate said last mentioned means.

2. In a grinding machine, a base, a grinding wheel supported thereby, a turn-table supported by the base, an arcuate slide mounted to rotate upon said turn-table and a second arcuate slide mounted to rotate upon the last mentioned slide and adapted to support a tool in position to be ground by said wheel.

3. In a grinding machine, a base, a grinding wheel supported by the base, a carriage mounted for vertical adjustment upon the base, a slide mounted upon said carriage, a second slide mounted upon the last mentioned slide, an arcuate slide rotatably mounted upon the second mentioned slide and an arcuate tool holding slide mounted upon the last mentioned slide and adapted to support a tool in position to be ground by said wheel.

4. In a grinding machine, a base, a grinding wheel supported upon the base, a carriage mounted for vertical adjustment upon the base, a slide supported by said carriage, a second slide mounted upon the last mentioned slide, a turn-table mounted upon said second mentioned slide, an arcuate slide carried by said turn-table, and a tool holding slide adjustable upon the last mentioned slide and adapted to support a tool in position to be ground by said wheel.

5. In a grinding machine, a base, a grinding wheel supported by the base, a carriage adjustable vertically upon the base, a turn-table supported by the carriage, said turn-table and its supporting carriage being graduated in degrees and minutes whereby the extent of rotation of the table may be determined, an arcuate slide supported by said table, said table and slide being graduated to permit the latter to be set at a predetermined angle and a second tool holding arcuate slide mounted upon the first mentioned arcuate slide, said arcuate slides being graduated to permit adjustment of the one upon the other to any desired angle.

6. In a grinding machine, a base, a carriage mounted thereon, a tool holding slide mounted upon the carriage, an upstanding post upon the slide, a removable cap upon the post adapted to receive one portion of the tool, the opposite portion of which is supported by said slide and a clamp surrounding the post and engaging the tool to hold it in fixed position upon said cap and said slide.

7. In a machine of the class described, a tool holding slide having a post extending upwardly thereon, a removable cap upon the post provided with a notch adapted to receive one end of the tool, said slide being provided with a shoulder forming a set for the tool, and means adapted to clamp the tool upon said cap and said shoulder.

8. In a machine of the class described, a tool holding slide having a post extending upwardly thereon, an abutment upon said slide forming a seat for the tool, a removable cap upon the post provided with a notch adapted to receive the upper end of the tool, a clamping yoke for the tool surrounding said post and held against displacement by said cap, and a screw for clamping said yoke upon said tool.

9. In a machine of the class described, a tool holding slide having an abutment formed upon one side thereof, a post extending upwardly upon the slide in line with the abutment, a removable cap secured upon the upper end of the post provided with a notch adapted to receive the upper end of the tool, a member adapted to engage the tool between the abutment and said removable cap and a screw extending through said member and engaging said post to clamp said member upon the tool.

In testimony whereof I affix my signature.

HANS LUTZ.